United States Patent [19]

D'Urso

[11] Patent Number: 5,022,532
[45] Date of Patent: Jun. 11, 1991

[54] UNIT FOR GRADING PRODUCE, SUCH AS FRUITS

[75] Inventor: Carmelo D'Urso, Le Chesnay, France

[73] Assignee: Xeda International, Le Chesnay, France

[21] Appl. No.: 283,995

[22] PCT Filed: Mar. 10, 1988

[86] PCT No.: PCT/FR88/00133
§ 371 Date: Jan. 11, 1989
§ 102(e) Date: Jan. 11, 1989

[87] PCT Pub. No.: WO88/06928
PCT Pub. Date: Sep. 22, 1988

[30] Foreign Application Priority Data

Mar. 11, 1987 [FR] France .................. 87 03344

[51] Int. Cl.[5] ................ B07C 5/18; B07C 5/28; G01G 21/00
[52] U.S. Cl. ..................... 209/564; 209/513; 209/593; 209/596; 209/912; 177/145
[58] Field of Search ........ 209/539, 540, 545, 563–566, 209/592–596, 651–654, 912, 917, 925, 934, 512–514; 198/504; 177/1, 145

[56] References Cited

U.S. PATENT DOCUMENTS

| | | | |
|---|---|---|---|
| 2,308,729 | 1/1943 | Walter | 209/593 X |
| 2,759,603 | 8/1956 | Bradley | 209/596 X |
| 3,578,160 | 5/1971 | Martini | 209/698 X |
| 3,770,111 | 11/1973 | Greenwood et al. | 209/644 X |
| 3,857,488 | 12/1974 | Le Cren | 209/593 |
| 4,478,302 | 10/1984 | Niederer et al. | 209/592 X |
| 4,967,857 | 11/1990 | Kent et al. | 177/145 |

FOREIGN PATENT DOCUMENTS

| | | | |
|---|---|---|---|
| 1238102 | 10/1959 | France . | |
| 1306353 | 11/1961 | France . | |
| 0369416 | 4/1973 | U.S.S.R. | 177/145 |
| 878320 | 9/1961 | United Kingdom . | |
| 1395868 | 5/1975 | United Kingdom . | |
| 1549785 | 8/1979 | United Kingdom | 198/504 |
| 2140164 | 11/1984 | United Kingdom . | |
| 2214646 | 9/1989 | United Kingdom | 177/145 |

Primary Examiner—Michael S. Huppert
Assistant Examiner—Edward M. Wacyra
Attorney, Agent, or Firm—Wenderoth, Lind & Ponack

[57] ABSTRACT

The invention is embodied as a unit for grading produce and comprises a transporting device having parallel belts and receptacles which open downwardly and in which produce is arranged, and a weighing station comprising a weighing wheel driven in rotation by a gear motor and a section of which projects into the receptacles so as to carry the produce as it passes through the weighing station. The weighing wheel and the gear motor are supported by a device for weighing the produce. The unit also includes a grading station comprising several stations for ejecting the produce from the transporting device into a device for removing the produce as a function of the weight of the produce.

28 Claims, 4 Drawing Sheets

UNIT FOR GRADING PRODUCE, SUCH AS FRUITS

BACKGROUND OF THE INVENTION

The present invention relates to a unit or apparatus for grading produce, such as fruits.

Prior art grading units have consisted of bucket conveyors in which fruits are placed, for example by means of automatic feed devices.

The buckets are connected to the conveyors in a manner such that they can be weighed freely when they pass through a first part of the unit and pivot at the moment of discharging the fruit contained in the bucket for grading thereof.

The weight of the fruit is obtained by automatically subtracting the weight of the bucket from the weight of the bucket and fruit as measured together. The information obtained makes it possible to control a means for discharging the fruit such that the fruits can be classified according to weight.

However, these devices present certain drawbacks, the most important of which lies in the fact that it is not possible to eliminate from the measurement the effects of friction created because the bucket is weighed while being moved. Moreover, the vibrations generated by this movement interfere with and thus reduce the accuracy of the weighing process.

The aim of the invention is therefore to solve these problems by providing a grading unit which is simple, reliable, of a moderate cost and accurate in measuring the weight of the produce such that grading thereof is more accurate.

SUMMARY OF THE INVENTION

To this end, the subject of the invention is a unit for grading produce, such as fruits, characterized in that it comprises a transporting means which includes parallel belts and receptacles which support the produce but open downwardly, a weighing station which includes carrying means driven by a gear motor and a section of which projects into the receptacles so as to carry the produce when it passes through the weighing station device for weighing the produce which supports the weighing means and the gear motor, and a grading station comprising a station for ejecting the produce from the transporting means into a means for removing the produce, as a function of the weight of the produce.

Advantageously, the unit according to the invention also comprises feed means for feeding the produce and means for transferring the produce from the feed means into the receptacles of the transporting means.

BRIEF DESCRIPTION OF THE DRAWINGS

The invention will be better understood with the aid of the following description which is given solely by way of example and which is made with reference to the appended drawings, wherein.

DETAILED DESCRIPTION OF THE INVENTION

Figure 1:
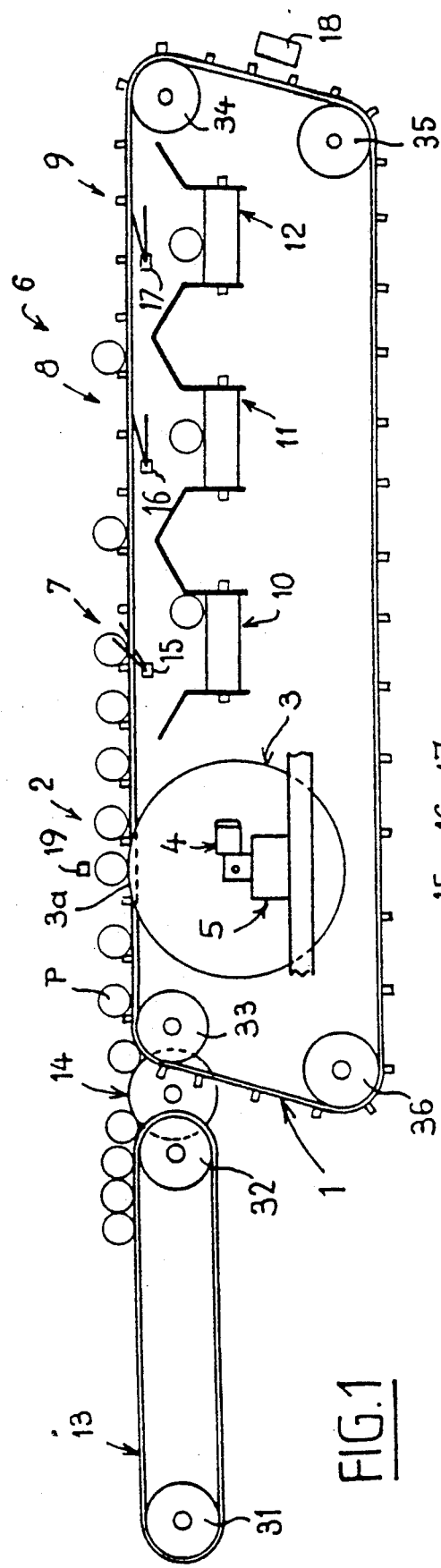
FIG. 1 is a schematic view of a grading unit according to the invention.

As may be seen in FIG. 1, a unit for grading produce according to the invention comprises a transporting means having parallel belts and receptacles with lower openings and in which the produce P is arranged. The unit according to the invention also comprises a weighing station 2 comprising produce carrying means consisting, for example, of a weighing wheel 3 which is rotatably driven by a gear motor 4. A section 3a of the weighing wheel 3 projects into the receptacles of the transporting means 1 so as to carry the produce as the produce passes through the weighing station.

The wheel 3 and the gear motor 4 are supported by a weighing device 5 for weighing the produce. The weighing device 5 is itself supported, for example, by the frame of the unit. The weighing device 5 makes it possible to determine the actual weight of the produce by subtracting the weight measured when there is no produce on the wheel from the weight measured when there is produce on the wheel.

The unit according to the invention also comprises a grading station 6 comprising several stations 7, 8 and 9 for ejecting the produce from the transporting means 1 into the means 10, 11 and 12 for removing the produce, respectively, as a function of the weight of the latter.

A feed means 13 for transporting the produce and transfer means 14 for transferring the produce from the feed means 13 into the receptacles of the transporting means 1 are also provided in order to ensure automatic feed.

As shown in FIG. 1, the transfer means 14 advantageously consists of a transferring wheel inserted between the transporting means 1 and the feed means 13. This wheel will be described in more detail below.

Each ejection station comprises an ejection means (15, 16 and 17, respectively), which is driven by a control device connected to the weighing device 5 and to a detector 18 for detecting the position of the produce with respect to the ejection stations. Moreover, a sensor 19 also makes it possible to detect the presence of a fruit in the weighing station in order to trigger measuring.

Figure 2:
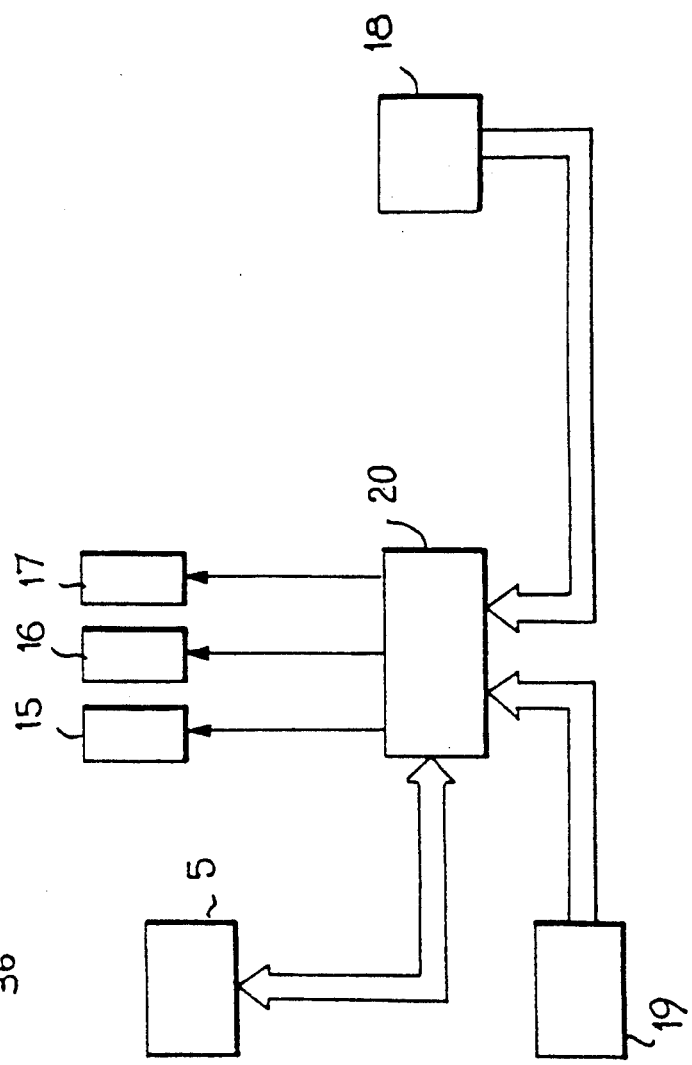
FIG. 2 represents a block diagram illustrating the operation of the grading unit according to the invention.

As is represented in FIG. 2, which illustrates the operation of a unit according to the invention, a control device 20 receives information from the sensor 19 which indicates to it that a fruit is in a weighing position. The control device 20 then triggers the weighing device 5 so that it performs a measurement and the control device 20 receives from the weighing device 5 a signal corresponding to the weight of the wheel/gear motor/produce group, from which it determines the weight of the produce. This weight is then stored by the control device and, as a function of the position of the produce as indicated by the detector 18, and the control device 20 activates one of the ejection means 15, 16, 17 in dependence on the weight of the produce so as to eject the produce into the removal means corresponding to the weight grade determined. The various means described above present no particular problems in implementation and will not be described in further detail.

The produce which is first arranged on the feed means 13 is transported by the latter to the transferring wheel 14 which ensures proper transfer and positioning of the produce one by one, into respective receptacles of the transporting means 1, as illustrated in FIG. 1. The produce then passes through the weighing station 2 and is then ejected from the transporting means towards the removal means 10, 11 and 12 which removes them according to grade.

The speed of rotation of the transferring wheel 14 should be at least equal to the speed of rotation of the feed means 13 and should be less than the speed of rotation of the transporting means 1 in order to coordinate the various displacements of the produce on the various transporting and transferring means.

Moreover, the weighing wheel 3 and the transferring wheel 14 may also have flaps mounted on their periphery for receiving the produce so as to facilitate movement of the produce by the wheels.

Both the weighing wheel and the transferring wheel preferably comprise at least two discs of the same diameter separated by a distance which is less than the size of the produce so as to ensure proper support for the produce.

Figure 3:
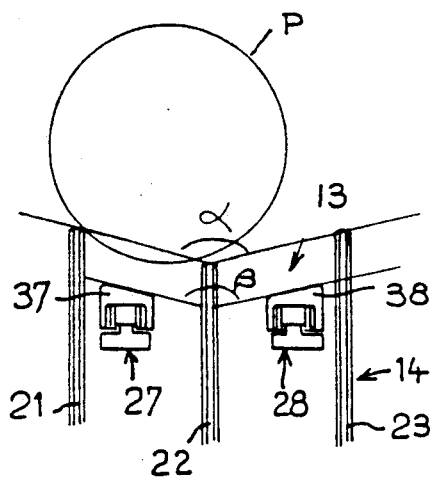
FIG. 3 is a partial view of a feed means and of a transferring wheel of the invention.
Figure 4:
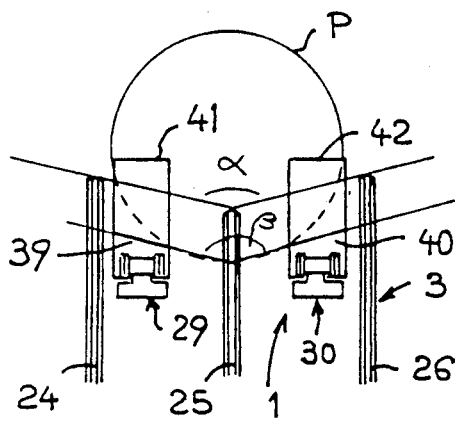
FIG. 4 is a partial view of a transporting means and of a weighing wheel of the invention.

As may be seen in FIG. 3 and 4, the transferring wheel 14 and the weighing wheel 3 can each comprise a set of three discs 21, 22, 23 and 24, 25, 26, respectively. The two outer discs of each set (i.e. discs 21, 23 and 24, 26, respectively) are of equal diameter. The center disc of each set (i.e. discs 22 and 25, respectively) have a diameter which is less than the diameter of the two outer discs so that straight lines passing through the upper most points of each of the outer discs and the center discs have an angle $\alpha$ of between 100° and 180° formed therebetween. This angle provides good support and lateral guiding for the produce.

Moreover, each of the feed means 13 and the transporting means 1 can also comprise at least two elongated elements (27, 28 and 29, 30, respectively) for transporting and for laterally guiding the produce. These two elongated transporting elements are arranged in parallel and are separated from one another by a distance which is less than the size of the produce so as to form a support and guiding chute for the latter. The transporting elements 27, 28 and 29, 30 form, as shown in FIG. 1, loops which are trained around two guiding members 31, 32 for the feed means 13, and are trained around four guiding members 33, 34, 35, 36 for the transporting means 1.

Advantageously, these transporting elements consist of chains with links upon which support members 37, 38 and 39, 40, respectively, are fixed. The produce is supported on the upper faces of the support members 37, 38 and 39, 40 (see especially FIG. 4).

According to one embodiment, the upper faces of the support members 37, 38 and 39, 40 form an angle $\beta$ therebetween of at least 100°. According to one particular embodiment, these upper faces are arranged in one and the same plane (i.e. $\beta = 180°$).

As shown in FIG. 4, the receptacles of the transporting means 1 can be delimited by parts 41, 42 projecting from the transporting elements 29 and 30.

Figure 5:
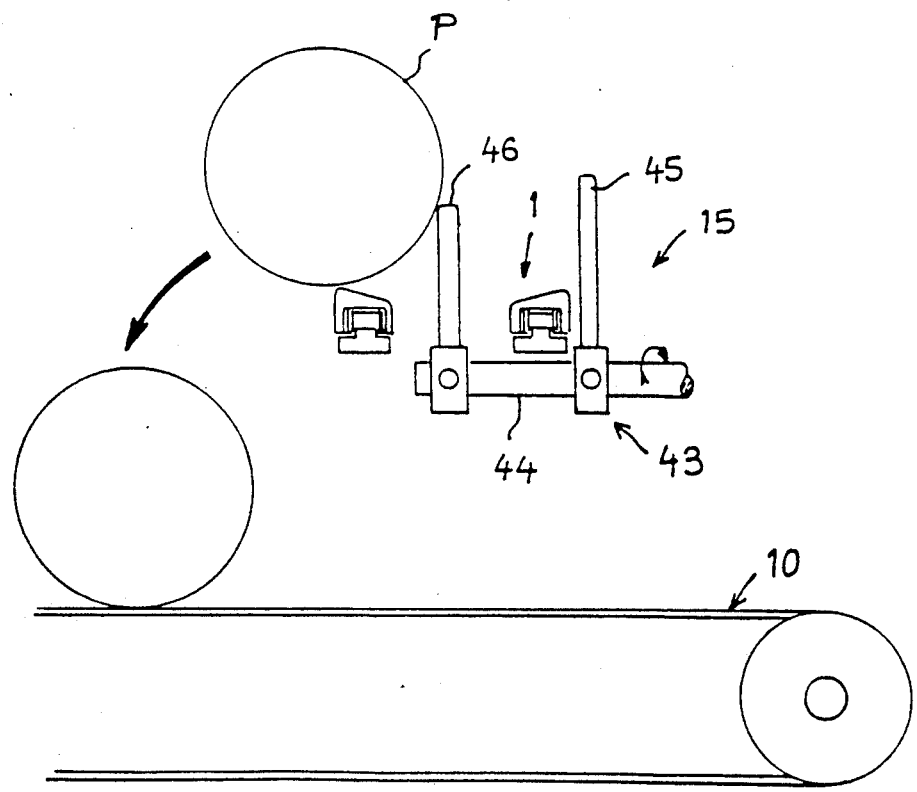
FIG. 5 illustrates the operation of an ejection means of the invention.
Figure 6:
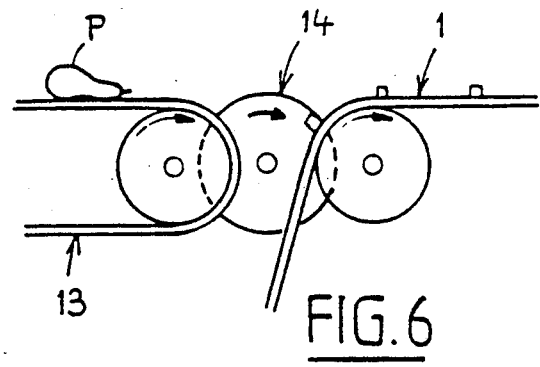
FIG. 6, 7, 8 and 9 illustrate different stages of a process of turning a fruit in a unit according to the invention.
Figure 7:
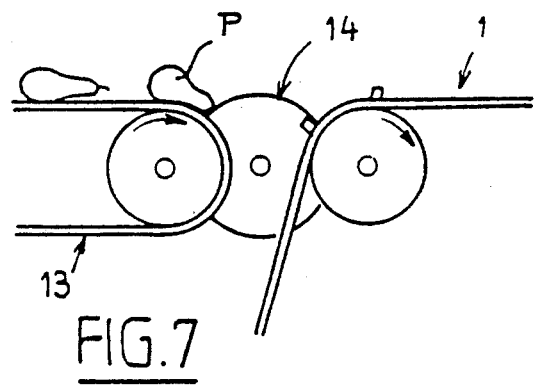
Figure 8:
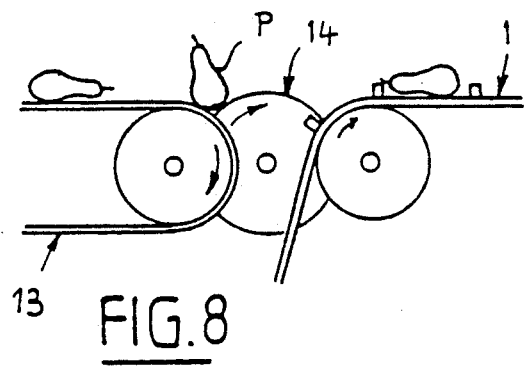
Figure 9:
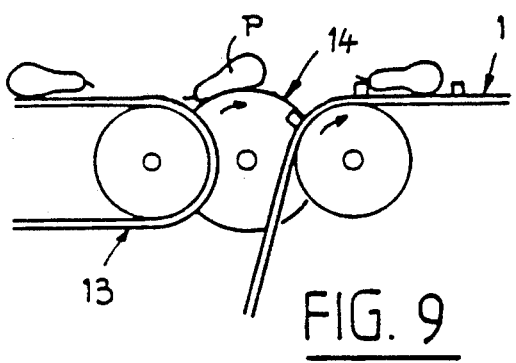

Each of the ejection means, for example the ejection means 15 (FIG. 5), comprises an actuator 43 arranged below the transporting means 1. The actuator 43 included an exit shaft 44 which comprises at least one ejection finger and, in the example illustrated, two ejection fingers 45, 46 offset angularly so as to eject the produce P in a specific direction onto the removal means 10, for example, following a command from the corresponding actuator.

The produce P shown in the figures may consist, for example, of oranges or apples of an approximately spherical shape. However, it should be noted that the unit according to the invention is also suitable for weighing and grading produce, such as pears or avocados, which have a first part whose shape corresponds approximately to a section of a sphere and a second part which extends from the first part in an approximately frustoconical shape, and in which the first part has a mass greater than the second. In this case, and as is represented in FIGS. 6 to 9, the feed means 13 and the transferring wheel 14 form a device for positioning this produce in a specific direction. In fact, the intersection between the feed means 13 and the transferring wheel 14 forms a space, with a flared V-shaped cross section, for turning produce which arrives with its approximately frustoconical smaller mass in front by way of relative movement between the two branches of the V formed by the opposing sections of the feed means 13 and the transferring wheel 14. As has been described above, the feed means and the transferring means comprise means for laterally guiding the produce so that its axis of displacement (feed direction) of the feed means and the transferring means, such that produce which arrives with its section of approximately frustoconical shape at the front can be set upright and then turned and finally transferred by the transferring wheel to the transporting means 1.

It goes without saying that the wheel for transferring the produce may consist of any transferring means which defines, with the feed means 13, a space having a flared V-shaped cross section for turning the produce.

Figure 10:
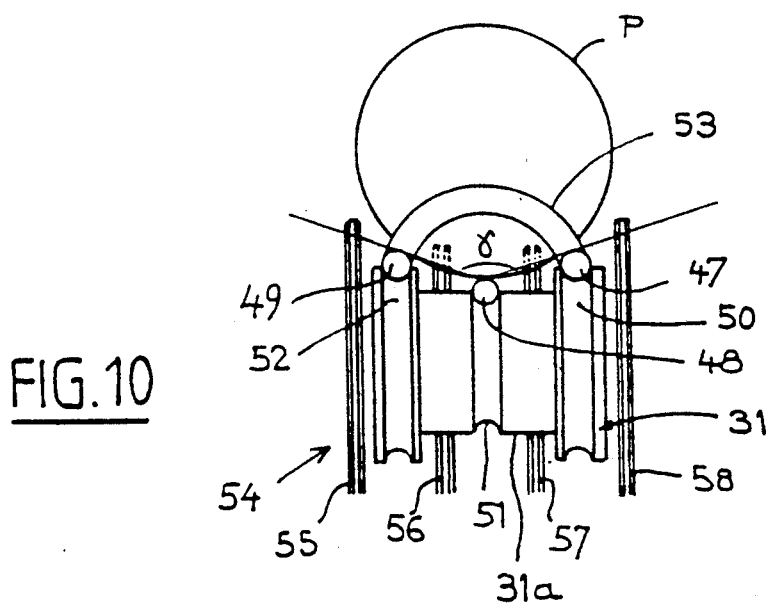
FIG. 10 represents a different embodiment of the transporting means and of a weighing wheel according to the invention.

As shown in FIG. 10, which represents a different embodiment of the feed means and/or of the transporting means, the transporting means can consist of three transporting elements 47, 48 and 49 consisting, for example, of cylindrical belts of a deformable material trained around the guiding means mentioned above.

These guiding means, for example 31, comprise three guiding grooves 50, 51, 52, one 51 of which is arranged in a portion 31a of the guiding means 31 which has a reduced cross section for guiding the center transporting element 48 arranged between the two outer transporting elements 47 and 49, so that planes tangent to the free surfaces of the belts form an angle $\gamma$ of at least 100° between them.

In this embodiment, the receptacles of the transporting means can, for example, consist of pieces 53 in the shape of a bridge extending between the two outer transporting elements 47 and 49.

The weighing wheel 54 and/or the transferring wheel can comprise four discs 55, 56, 57, 58 to ensure proper guiding of the produce as it is transferred and/or as it is weighed.

Figure 11:
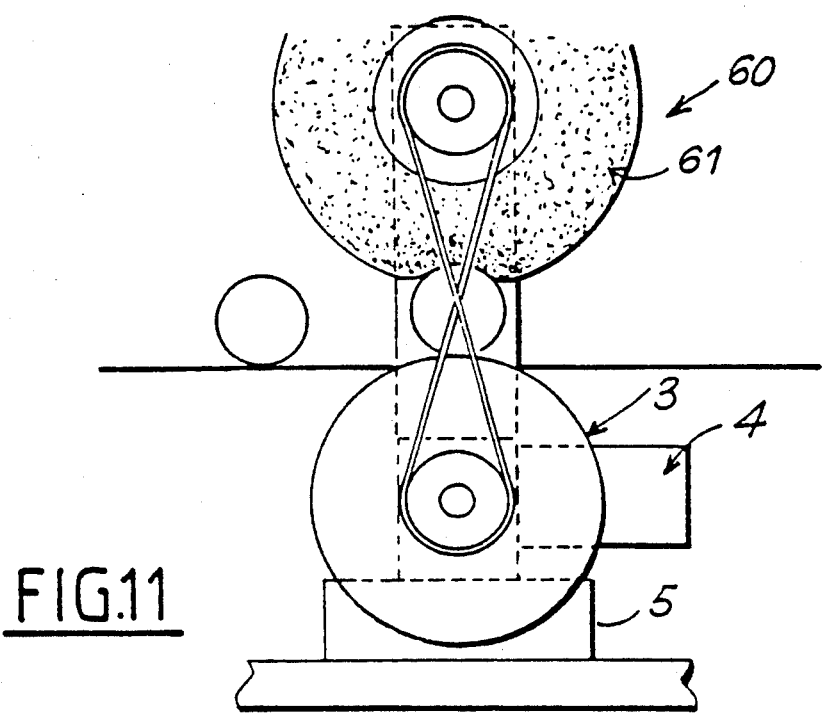
FIG. 11 represents another embodiment of the weighing means according to the invention.

As shown in FIG. 11, which represents yet another embodiment of the weighing means according to the invention, the weighing station 2 comprises a carrying means which, for example, includes the weighing wheel 3 driven in rotation by the gear motor 4, and the weighing device 5 for supporting the weighing wheel 3 and the motor 4 and for weighing the produce, as well as means 60 for gripping the produce when it passes into the weighing station.

Advantageously, the gripping means 60 comprises an auxiliary wheel 61 consisting of a deformable material such as, for example, rubber. The auxiliary wheel 61 is arranged above the weighing wheel 3 and has an axis which is parallel to the axis of the weighing wheel 3, so as to provide a deformable weighing passage between these two wheels of a size which is less than the size of the produce.

The auxiliary wheel 61 is driven at the same speed but in the opposite direction of rotation with respect to the weighing wheel 3. The auxiliary wheel 61 is driven by the gear motor 4 via a system of pulleys and a belt. This arrangement provides an advantageous gripping of the produce as it passes into and through the weighing station.

As also shown in FIG. 11, the weighing station is arranged such that the produce is gripped between the weighing wheel 3 and the auxiliary wheel 61 which deforms in an elastic manner so as to avoid any damage to the produce as the produce passes into and through the weighing station.

It should be noted that the weighing wheel 3 and the auxiliary wheel 61 preferably have the same initial diameter. This makes it possible to provide proper gripping of the produce when the produce arrives in the weighing station so as to avoid round produce, such as oranges, from idly spinning about their own axes when they encounter the weighing wheel 3.

It should also be noted that the auxiliary wheel 61 is carried by the measuring device 5 so as to avoid interfering with the measurement.

Moreover, this device also results in increased accuracy of measurement since the gripping means holds the produce as it is being weighed.

Figure 12:
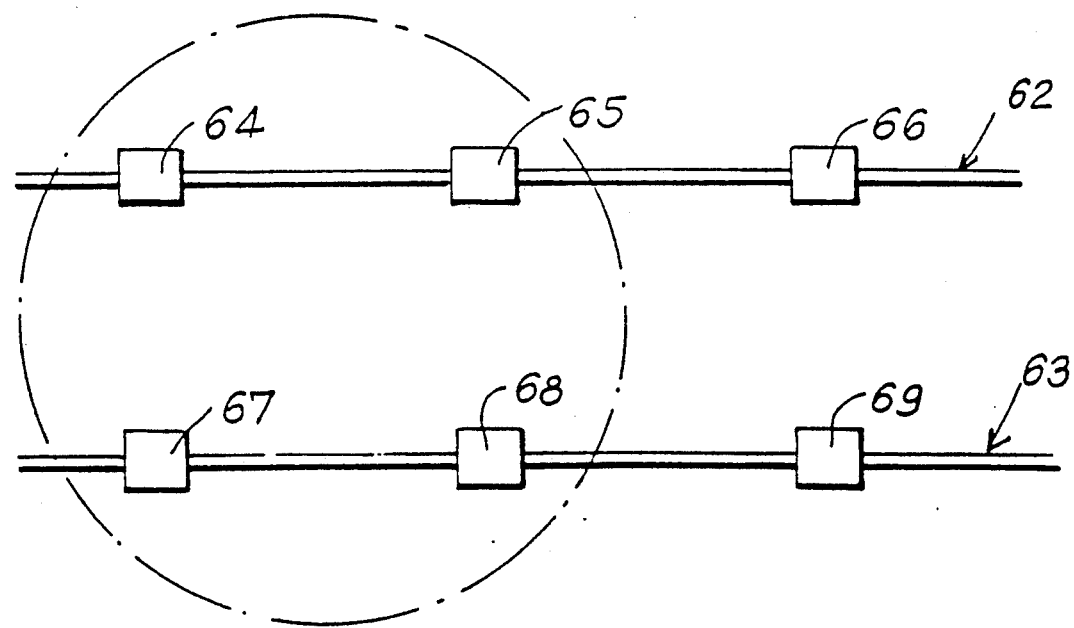
FIG. 12 represents another embodiment of transporting means according to the invention.

Finally, and as shown in FIG. 12, the transporting means can also consist of parallel belts 62 and 63 on which support studs, for example 64, 65, 66 and 67, 68, 69, respectively, are fixed. These support studs form, in groups of four, means for supporting produce (represented by phantom lines in FIG. 12).

I claim:

1. An apparatus for grading produce, comprising:
   transporting means for transporting the produce, said transporting means comprising two parallel elements and produce receptacles operatively connected to said parallel elements for receiving produce, each of said receptacles having a lower opening;
   a weighing station comprising a produce carrying means for carrying and supporting the produce as it is being weighed, a motor operatively connected to said produce carrying means to drive said produce carrying means and a weighing means for supporting said produce carrying means and said motor and for weighing said produce, said produce carrying means including a section which projects through said lower opening in each of said receptacles as they pass thereover so as to carry the produce as it passes through the weighing station;
   means for removing the produce as a function of the weight of the produce; and
   a grading station comprising a plurality of ejection stations, each of which includes a means for ejecting the produce from said transporting means into said removing means.

2. An apparatus as recited in claim 1, further comprising
   a feed means for feeding the produce to said transporting means; and
   a transferring means for transferring the produce from said feed means into said receptacles of said transporting means.

3. An apparatus as recited in claim 2, wherein
   said transferring means comprises a rotatable transferring wheel mounted between said feed means and said transporting means.

4. An apparatus as recited in claim 3, wherein
   said transferring wheel has flaps mounted about its periphery to aid in transferring the produce.

5. An apparatus as recited in claim 3, wherein
   said transferring wheel comprises at least two substantially parallel discs separated by a distance which is less than a diameter of the produce.

6. An apparatus as recited in claim 5, wherein
   said at least two substantially parallel discs comprises three substantially parallel discs, a center disc of said three discs having a smaller diameter than outer discs of said three discs such that a straight line passing through an uppermost point on the periphery of said center disc and an upper most point on the periphery of one of said outer discs forms an angle of between 100° and 180° with a straight line passing through said uppermost point on the periphery of said center disc and an uppermost point on the periphery of the other of said outer discs.

7. An apparatus as recited in claim 3, wherein
   means for causing said transferring means to move the produce at a speed at which said feed means moves the produce and less than a speed at which said transporting means moves the produce.

8. An apparatus as recited in claim 2, further comprising
   at least two guiding members; and
   wherein said feed means comprises two substantially parallel endless elements trained about said at least two guiding members, said two endless elements being separated by a distance which is less than a diameter of the produce such that they form a support and guiding chute for the produce.

9. An apparatus as recited in claim 8, wherein
   each of said two elongated elements comprises an endless chain formed of links; and
   support members are fixed to said links and are adapted to support produce on upper faces thereof.

10. An apparatus as recited in claim 9, wherein
    said support members are mounted such that upper faces of said support members on opposing ones of said endless chains are inclined toward each other such that a relative angle therebetween is at least 100°.

11. An apparatus as recited in claim 9, wherein
    said upper faces of said support members are arranged in the same plane.

12. An apparatus as recited in claim 8, wherein
    each of said at least two guiding members has three annular grooves therein, a center groove of said three annular grooves being formed in a small diameter portion of each of said at least two guiding members, and two outer grooves of said three annular grooves being formed in two larger diameter portions of each of said at least two guiding members relative to said small diameter portion; and said feed means comprises a third endless element substantially parallel with and mounted between said two endless elements, each of said three endless elements being formed as a deformable belt and disposed in a respective one of said three annular grooves of each of said guiding members;

such that a plane which is tangential to the center one of said endless belts and one of the outer ones of said endless belts is angled by at least 100° with respect to a plane which is tangential to said center one of said endless belts and the other of said outer ones of said endless belts.

13. An apparatus as recited in claim 1, wherein
said carrying means comprises a weighing wheel supported by said weighing means and rotatably driven by said motor.

14. An apparatus as recited in claim 13, wherein
said carrying means further comprises flaps mounted about a periphery of said weighing wheel to aid in carrying the produce.

15. An apparatus as recited in claim 13, wherein
said weighing wheel comprises at least two substantially parallel discs separated by a distance which is less than a diameter of the produce.

16. An apparatus as recited in claim 15, wherein
said at least two substantially parallel discs comprise three substantially parallel discs, a center disc of said three discs having a smaller diameter than outer discs of said three discs such that a straight line passing through an uppermost point on the periphery of said center disc and an uppermost point on the periphery of one of said outer discs forms an angle of between 100° and 180° with a straight line passing through said uppermost point on the periphery of said center disc and an uppermost point on the periphery of the other of said outer discs.

17. An apparatus as recited in claim 13, wherein
said weighing station further comprises means for gripping the produce as it passes through said weighing station.

18. An apparatus as recited in claim 17, wherein
said gripping means comprises an auxiliary wheel formed of deformable material and mounted for rotation about an axis parallel to a rotational axis of said weighing wheel, said auxiliary wheel being separated from said weighing wheel by a weighing passage which is smaller than a diameter of the produce, and a means for connecting said auxiliary wheel to said motor such that said auxiliary wheel is driven in a direction opposite the direction in which said weighing wheel is driven.

19. An apparatus as recited in claim 1, further comprising
at least two guiding members; and
wherein said two parallel elements of said transporting means comprise two substantially parallel endless elements trained about said at least two guiding members, said two endless elements being separated by a distance which is less than a diameter of the produce such that said two endless elements form a support and guiding chute for the produce.

20. An apparatus as recited in claim 19, wherein
each of said two elongated elements comprises an endless chain formed of links; and
support members are fixed to said links and are adapted to support produce on upper faces thereof.

21. An apparatus as recited in claim 20, wherein
said support members are mounted such that upper faces of said support members on opposing ones of said endless chains are inclined toward each other such that a relative angle therebetween is at least 100°.

22. An apparatus as recited in claim 20, wherein
said upper faces of said support members are arranged in the same plane.

23. An apparatus as recited in claim 19, wherein
each of said at least two guiding members has three annular grooves therein, a center groove of said three annular grooves being formed in a small diameter portion of each of said at least two guiding members, and two outer grooves of said three annular grooves being formed in two larger diameter portions of each of said at least two guiding members relative to said small diameter portion; and
said transporting means further comprising a third endless element substantially parallel with and mounted between said two endless elements, each of said three endless elements being formed as a deformable belt and disposed in a respective one of said three annular grooves of each of said guiding members;
such that a plane which is tangential to the center one of said endless belts and one of the outer ones of said endless belts is angled by at least 100° with respect to a plane which is tangential to said center one of said endless belts and the other of said outer ones of said endless belts.

24. An apparatus as recited in claim 19, wherein
said receptacles of said transporting means are delimited by parts projecting upwardly from said endless elements.

25. An apparatus as recited in claim 19, wherein
said receptacles of said transporting means are delimited by bridge shaped elements extending between said endless elements.

26. An apparatus as recited in claim 1, further comprising
control means for controlling each of said ejecting means;
detector means for detecting positions of the produce relative to each of said ejecting means and for providing a position signal to said control means; and
wherein said weighing means is operable to provide a weight signal to said control means.

27. An apparatus as recited in claim 26, wherein
each of said ejecting means comprises an actuator means for causing said ejecting means to eject the produce in a desired direction onto said removal means, said actuator means being mounted below said transporting means and including an exit shaft and at least one ejection finger extending from said exit shaft.

28. An apparatus as recited in claim 1, wherein
each of said parallel elements of said transporting means comprises an endless belt having a plurality of studs mounted thereon to support the produce.

* * * * *